(12) United States Patent
Sakashita et al.

(10) Patent No.: US 9,438,379 B2
(45) Date of Patent: Sep. 6, 2016

(54) COMMUNICATION DEVICE, COMMUNICATION PROGRAM, COMMUNICATION METHOD, AND INFORMATION PROCESSING DEVICE

(71) Applicant: Hitachi Information & Telecommunication Engineering, Ltd., Yokohama-shi, Kanagawa-ken (JP)

(72) Inventors: Asako Sakashita, Yokohama (JP); Suzuka Morotomi, Yokohama (JP); Takuro Kaneko, Yokohama (JP); Naoya Kumada, Yokohama (JP); Yukio Yasumoto, Yokohama (JP); Yoshihiko Yagi, Yokohama (JP)

(73) Assignee: Hitachi Information & Telecommunication Engineering, Ltd., Yokohama-shi (JP)

( * ) Notice: Subject to any disclaimer, the term of this patent is extended or adjusted under 35 U.S.C. 154(b) by 113 days.

(21) Appl. No.: 14/447,268

(22) Filed: Jul. 30, 2014

(65) Prior Publication Data

US 2015/0280864 A1 Oct. 1, 2015

(30) Foreign Application Priority Data

Mar. 28, 2014 (JP) .................................. 2014-067486

(51) Int. Cl.
| | |
|---|---|
| *H04L 12/28* | (2006.01) |
| *H04L 1/00* | (2006.01) |
| *H04L 12/721* | (2013.01) |
| *H04L 12/939* | (2013.01) |
| *H04L 1/20* | (2006.01) |
| *H04N 21/242* | (2011.01) |
| *H04N 21/43* | (2011.01) |
| *H04N 21/647* | (2011.01) |

(52) U.S. Cl.
CPC ............. *H04L 1/0083* (2013.01); *H04L 1/201* (2013.01); *H04L 45/70* (2013.01); *H04L 49/552* (2013.01); *H04N 21/242* (2013.01); *H04N 21/4305* (2013.01); *H04N 21/64784* (2013.01)

(58) Field of Classification Search
USPC ....................................................... 714/746
See application file for complete search history.

(56) References Cited

U.S. PATENT DOCUMENTS

| | | | | |
|---|---|---|---|---|
| 6,549,886 B1 * | 4/2003 | Partalo | .................. | G10L 19/005 704/203 |
| 2005/0249326 A1 * | 11/2005 | Popescu | ................. | A61B 6/586 378/4 |
| 2006/0152605 A1 * | 7/2006 | Okazaki | ............... | H04N 19/176 348/246 |
| 2011/0110330 A1 * | 5/2011 | Kim | ...................... | H04W 36/02 370/331 |
| 2012/0147140 A1 * | 6/2012 | Itakura | .................. | H04L 1/0041 348/43 |
| 2012/0151291 A1 * | 6/2012 | Sugimoto | ............. | H04L 1/1812 714/746 |

FOREIGN PATENT DOCUMENTS

JP 2011-9927 A 1/2011

* cited by examiner

*Primary Examiner* — Duc C Ho
(74) *Attorney, Agent, or Firm* — Crowell & Moring LLP

(57) ABSTRACT

Disclosed is a communication technology in which the effect of packet loss can be easily reduced to the extent that it can be ignored, even on networks where packet loss can easily occur. Specifically, a communication device is disclosed that includes a packet loss determination unit that determines whether a packet that transmits image information has been lost, and an interpolated packet transmission unit that transmits an interpolated packet when a packet that transmits image information has been lost.

7 Claims, 12 Drawing Sheets

COMMUNICATION DEVICE, COMMUNICATION PROGRAM, COMMUNICATION METHOD, AND INFORMATION PROCESSING DEVICE

FIELD OF THE INVENTION

The present invention relates to a communication device, a communication program, a communication method, and an information processing device. This application claims priority based on a Japanese Patent Application No. 2014-067486 filed on Mar. 28, 2014, the entire contents of which are incorporated by reference herein.

BACKGROUND OF THE INVENTION

Conventionally, in terrestrial digital broadcasting, a broadcast TS using MPEG-2 TS is sometimes used, and an OFDM modulator that converts the digital terrestrial broadcast to radio waves requires a broadcast TS and a clock synchronized with the broadcast TS. Microwaves are used for transmissions from the broadcast station (master) to the transmitting station, and a constant rate signal is sent (broadcast TS and clock). On the other hand, when transmitting signals via a transmission path where jitter can occur comparatively easily, transmission of signals at a constant rate is not guaranteed, so a stable broadcast TS and clock cannot be transmitted. For this, synchronization is enabled by means such as adding time stamp information at the transmitter side, as well as providing a voltage controlled crystal oscillator (VCXO) at the receiving side.

Regarding this type of technology, Patent Document 1 states: "The replication function 110 of a transmission device 100 that includes a plurality of 3 or more transmission ports 120a to 120c to which a plurality of packets having a sequence number indicating the packet sequence is input in order to transmit a single content, replicates the input packets into two or more copies, the number thereof being fewer than the number of ports, the replicated packets are distributed to the plurality of transmission ports, and are each distributed by multicast via a plurality of transmission paths 300a to 300c, and the restoration function 220 of a receiving device 200 arranges the multicast packets received from a plurality of reception ports connected to each of the transmission paths in sequence number order to restore the original single content.

PRIOR ART DOCUMENT

Patent Document

Patent Document 1: Japanese Unexamined Patent Application Publication No. 2011-009927A

SUMMARY OF THE INVENTION

Problem to be Solved by the Invention

In the technology disclosed in the above Patent Document 1, a plurality of transmission paths is required, so the transmission equipment can become complex and large.

It is an object of the present invention to provide communication technology in which the effect of packet loss can be easily reduced to the extent that it can be ignored, even on networks where packet loss can easily occur.

Means to Solve the Problem

The present application includes a plurality of means to solve at least part of the above problem, but the following is given as an example. In order to solve the above problem, the communication device according to the present invention includes a packet loss determination unit that determines whether a packet that transmits image information has been lost, and an interpolated packet transmission unit that transmits an interpolated packet when a packet that transmits image information has been lost.

Also, in the communication device as described above, the packet loss determination unit may determine that a packet has been lost when the interval between packets that transmit image information is equal to or greater than a predetermined interval.

Also, in the communication device as described above, the interpolated packet transmission unit may use a packet having specific information that the lost packet that transmits image information had.

Also, in the communication device as described above, the interpolated packet transmission unit may estimate the specific information of the lost packet that transmits the image information based on the specific information of the packet that transmits image information immediately before the loss, and transmit a packet having the estimated specific information and an appropriate Reed-Solomon code as the interpolated packet.

Also, in the communication device as described above, the interpolated packet transmission unit may have in advance the specific information of the packets to be transmitted as interpolated packets.

Also, the communication device as described above may further include a packet number counter unit that records received NULL packets in correspondence to the specific information, and the interpolated packet transmission unit uses the NULL packet as the packet to be transmitted as the interpolated packet.

Also, the communication program according to the present invention is a communication program that causes a computer to function as a communication device, the computer being operated as control means, the communication program causes the control means to execute: a packet loss determining step of determining whether a packet that transmits image information has been lost; and an interpolated packet transmitting step of transmitting an interpolated packet when a packet that transmits image information has been lost.

Also, the communication method according to the present invention is a communication method using a computer, in which the computer executes: a packet loss determining step of determining whether a packet that transmits image information has been lost; and an interpolated packet transmitting step of transmitting an interpolated packet when a packet that transmits image information has been lost.

Problems, configurations, and effects apart from the above will become clear from the description of the embodiments below.

Effects of the Invention

According to the present invention, it is possible to provide communication technology in which the effect of packet loss can be easily reduced to the extent that it can be ignored, even on networks where packet loss can easily occur.

DETAILED DESCRIPTION OF THE INVENTION

The following is a description of the respective embodiments of a transmission device 10 and a receiving device 20 which are a communication device that applies a first embodiment of the present invention, with reference to the drawings. The communication device relates to a device for transmitting and receiving packets via a transmission path such as the internet or the like, where non-synchronization, jitter, and data loss can occur comparatively easily, using video information packets such as MPEG-2 transport stream (TS) which require a particularly high transmission rate, internet protocol (IP), or the like.

Figure 1:
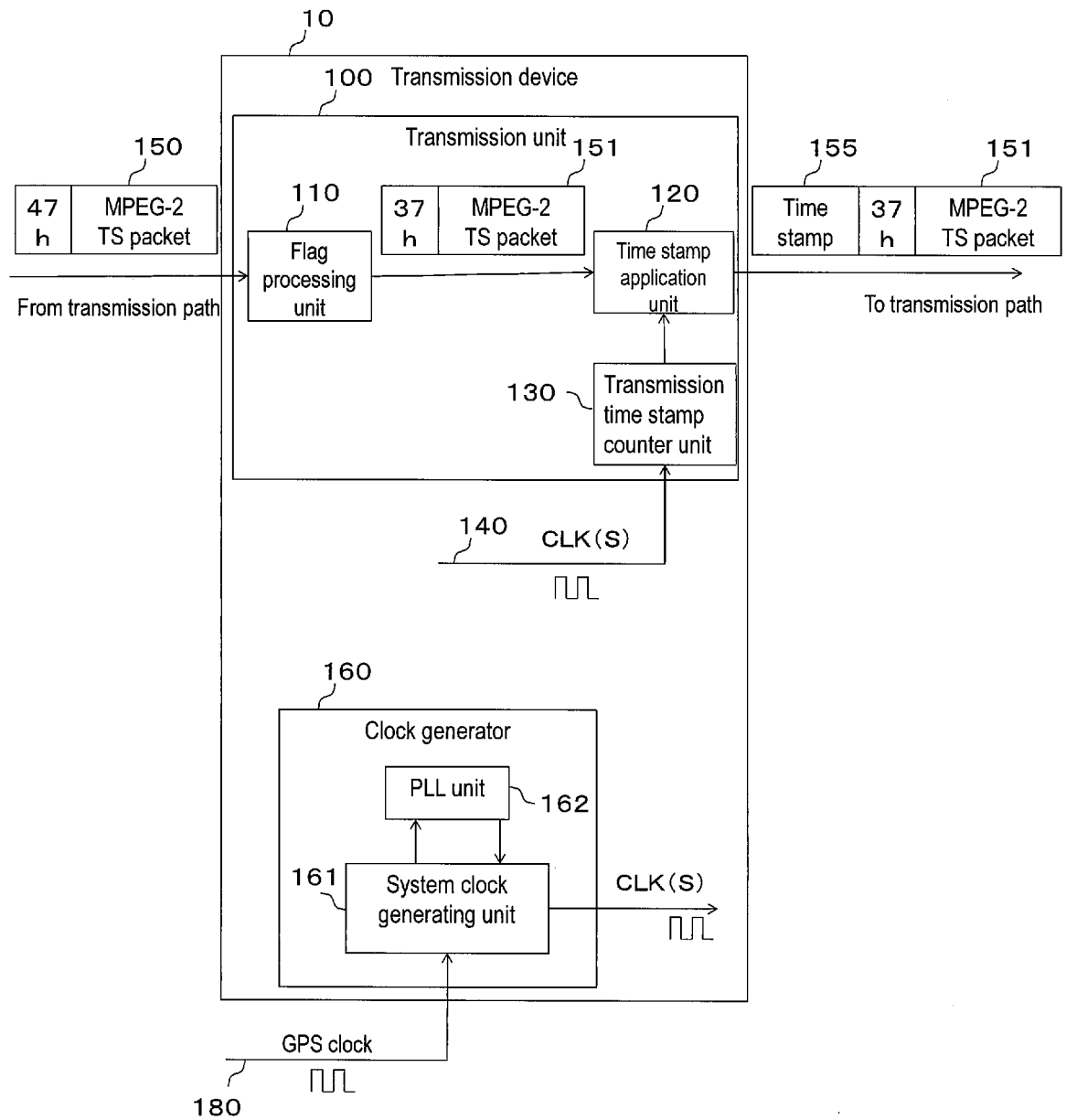
FIG. 1 is a block diagram of a transmission device according to a first embodiment of the present invention.

FIG. 1 is a block diagram of a transmission device 10 according to a first embodiment of the present invention. The transmission device 10 envisaged in the present embodiment includes a transmission unit 100 that transmits MPEG-2 TTS packets to a receiving device via a transmission path on which jitter could potentially occur, and a clock generator 160 that generates a clock (CLK(S)) that controls the operation of the transmission unit.

The clock generator 160 includes a system clock generating unit 161, and a PLL unit (for example, a PLL circuit) 162. Also, the system clock generating unit 161 uses a GPS clock 180 extracted from a GPS radio wave received from a GPS signal receiver and a system clock generating unit 161 generates a 27 MHz system clock using the PLL unit 162. The generated system clock CLK(S) is sent to the transmission unit 100, and used in the counter value of a transmission time stamp counter unit 130 that is described later.

The transmission unit 100 includes a flag processing unit 110, a time stamp application unit 120, and the transmission time stamp counter unit 130. The time stamp application unit 120 and the transmission time stamp counter unit 130 may also be referred to as the transmission time stamp generation unit. The transmission time stamp counter unit 130 generates a time stamp added to the MPEG-2 TS packets to be transmitted using a system clock CLK(S) 140 generated by the system clock generating unit 161. The time stamp application unit 120 adds the time stamp to the MPEG-2 TS packets to configure the MPEG-2 TTS packets, and transmits them to the transmission path. Upon receipt of one or a plurality of MPEG-2 TS packets, the flag processing unit 110 applies flag information to the packets at a predetermined interval in the packet forward reproduction direction.

Specifically, the flag processing unit 110 changes the first byte of the MPEG-2 TS packet lead position as a flag from 47h (fixed value in the packet front) to 37h at a predetermined interval (for example, every 32 packets) in the forward reproduction direction of one or a plurality of MPEG-2 TS packets 150 input to the transmission unit 100, and transmits it to the time stamp generation unit as an MPEG-2 TS packet 151.

The time stamp application unit 120 adds the time stamp obtained from the transmission time stamp counter unit 130 to a predetermined position of the MPEG-2 TS packet 151 as a time stamp 155. The time stamp application unit 120 transmits the MPEG-2 TS packet to which the time stamp 155 has been added to the transmission path as an MPEG-2 TTS packet.

Figure 2:
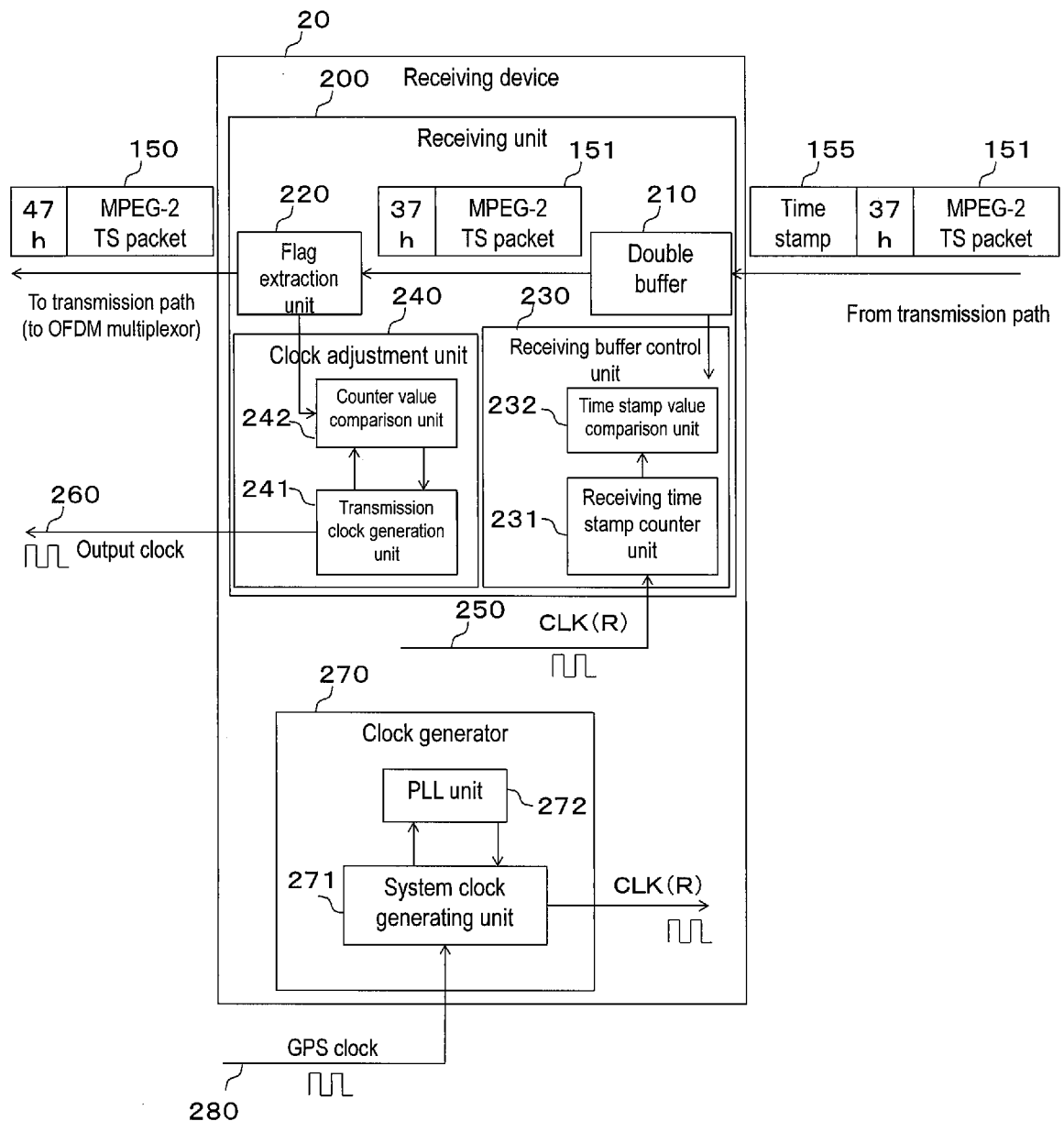
FIG. 2 is a block diagram of a receiving device according to the first embodiment of the present invention.

FIG. 2 is a block diagram of a receiving device 20 according to the first embodiment of the present invention. The receiving device 20 envisaged in the present embodiment includes a receiving unit 200 that receives MPEG-2 TTS packets from the transmission device 10 via a transmission path on which jitter could potentially occur, and a clock generator 270 that generates a clock (CLK(R)) for controlling the operation of the receiving unit.

The clock generator 270 includes a system clock generating unit 271, and a PLL unit (for example, a PLL circuit) 272. Also, the system clock generating unit 271 uses a GPS clock 280 extracted from a GPS radio wave received from a GPS signal receiver, to generate a 27 MHz system clock using the PLL unit 272. The generated system clock CLK(R) is sent to the receiving unit 200, and used in the counter value of a receiving time stamp counter unit 231 that is described later.

The receiving unit 200 includes a double buffer 210, a flag extraction unit 220, a receiving buffer control unit 230, and a clock adjustment unit 240. MPEG-2 TTS packets that have been input to the receiving unit 200 via the transmission path are stored in the double buffer 210. By providing a double storage area (receiving buffer) in the double buffer, it is possible to suppress jitter due to PCR by controlling writing to and reading from the receiving buffer, and it is possible to achieve stable reception and transmission of packets.

When flag information is included in the MPEG-2 TS packet 151 (the start of the packet begins with "37h"), the flag extraction unit 220 changes it to 47h (fixed value in the packet front). Also, the flag extraction unit 220 transmits the MPEG-2 TS packets 150 to the transmission path.

The receiving buffer control unit 230 includes the receiving time stamp counter unit 231 and a time stamp value comparison unit 232.

The receiving time stamp counter unit 231 generates a time stamp value that identifies the timing that a received MPEG-2 TTS packet was read from the double buffer 210 using a system clock CLK(R) 250 generated by the system clock generating unit 271.

The time stamp value comparison unit 232 compares the value of the time stamp 155 of each of the packets stored in the double buffer 210 with the time stamp values output by the receiving time stamp counter unit 231.

If the result of the comparison by the time stamp value comparison unit 232 is that an MPEG-2 TTS packet for which both time stamp values correspond (for example, they are the same) is identified, the receiving buffer control unit 230 removes the time stamp 155, and reads the packet as an MPEG-2 TS packet 151. The receiving buffer control unit 230 sends the MPEG-2 TS packet 151 that has been read to the flag extraction unit 220. At this time, in the case of packets for which the first byte at the beginning of the MPEG-2 TS packet is 37h, the receiving buffer control unit 230 sends the MPEG-2 TTS packets to a counter value comparison unit 242 as packets having flag information every predetermined number of packets (for example, every 32 packets).

The clock adjustment unit 240 includes a transmission clock generation unit 241, and the counter value comparison unit 242. The transmission clock generation unit 241 is, for example, a voltage controlled crystal oscillator (VCXO) that generates a clock of a specific frequency in accordance with the applied voltage. Also, the transmission clock generation unit 241 outputs an output clock 260 synchronized with the transmission of the MPEG-2 TS packets 150.

The counter value comparison unit 242 compares the interval for applying a flag (the synchronous count value of the clock if no packets are lost) with the count value measured (counted) on the clock generated by the voltage controlled crystal oscillator (VCXO) in the transmission clock generation unit 241, and identifies differences.

Figure 3:
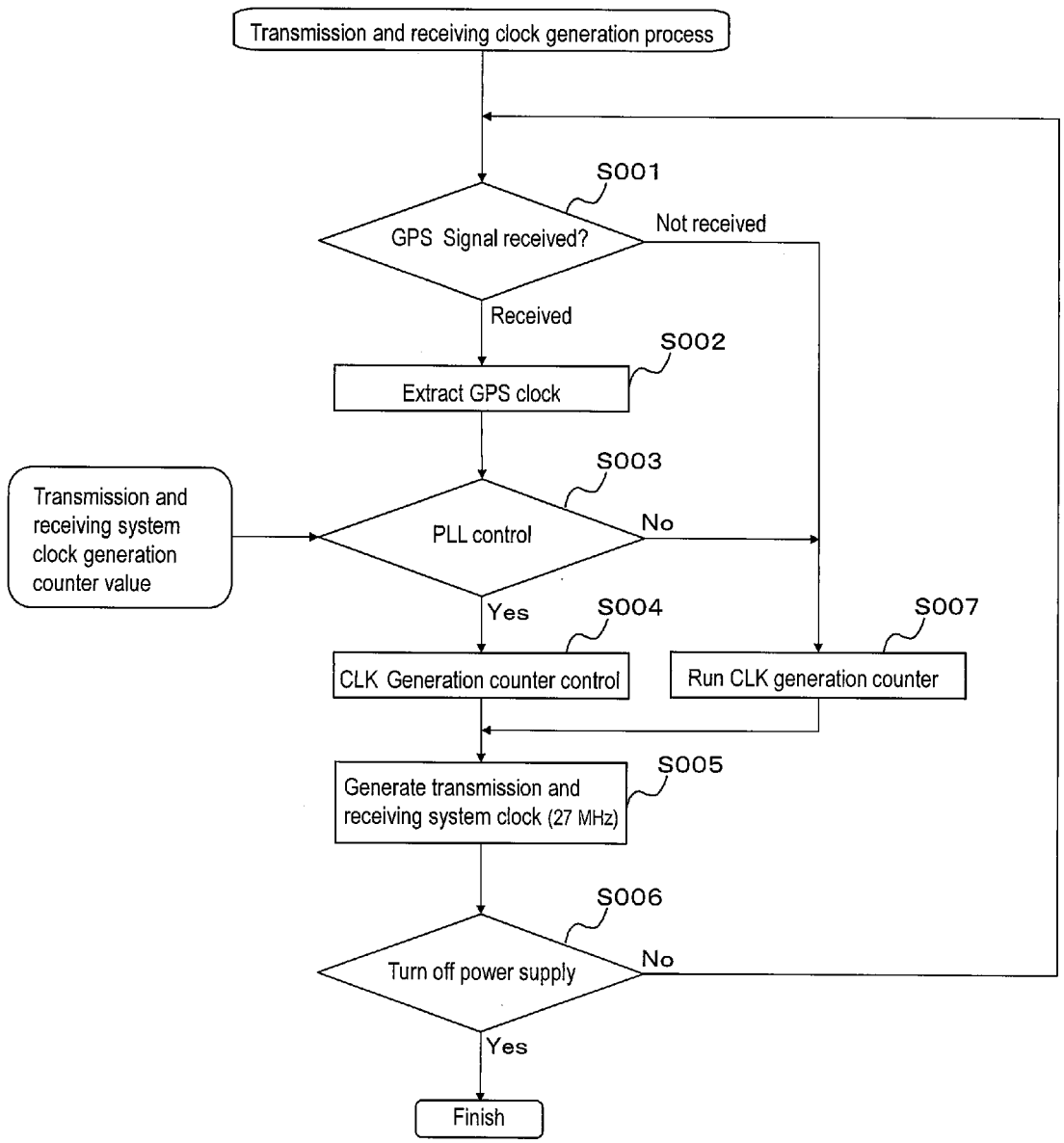
FIG. 3 is a view illustrating the process flow of a GPS clock generating process.

FIG. 3 illustrates the operational flow of the transmission and reception clock generation processes in the present embodiment. The transmission and reception clock generation processes are started when the transmission device 10 and the receiving device 20 are started up.

First, the system clock generating units 161, 271 determine whether or not a GPS signal receiver (not illustrated in the drawings) has received a GPS signal (step S001). Specifically, the system clock generating units 161, 271 inquire regarding the status of reception of GPS signals by the GPS signal receiver. If a GPS signal has not been received, the system clock generating units 161, 271 proceed to the process at step S007 which is described later.

If a GPS signal has been received ("Received" at step S001), the system clock generating units 161, 271 extract the GPS clock (step S002). Specifically, the system clock generating units 161, 271 extract the GPS clock from the received GPS signal.

Then, the PLL unit 162 determines whether PLL control is necessary by reference to the transmission and reception system clock generation counter value (step S003), and if PLL control is to be carried out, PLL unit 162 controls the transmission and reception system clock generation counter (step S004). Then, the PLL unit 162 generates a phase adjusted 27 MHz transmission and reception system clock (step S005).

The system clock generating units 161, 271 of the transmission device 10 or the receiving device 20 determine whether the power supply of the transmission device 10 or the receiving device 20 is turned off or not (step S006). If the power supply is turned off, the system clock generating units 161, 271 terminate the transmission and reception clock generation process, and if the power supply is not turned off control is returned to step S001.

If the system clock generating units 161, 271 have not received a GPS signal ("Not received" at step S001), or if PLL control is not carried out ("No" at step S003), the clock generation counter is allowed to run, and a 27 MHz transmission and reception system clock is generated (step S007).

This completes the process flow of the transmission and reception clock generation process. From the transmission and reception clock generation process, the system clock can be generated using the GPS clock.

Figure 4:
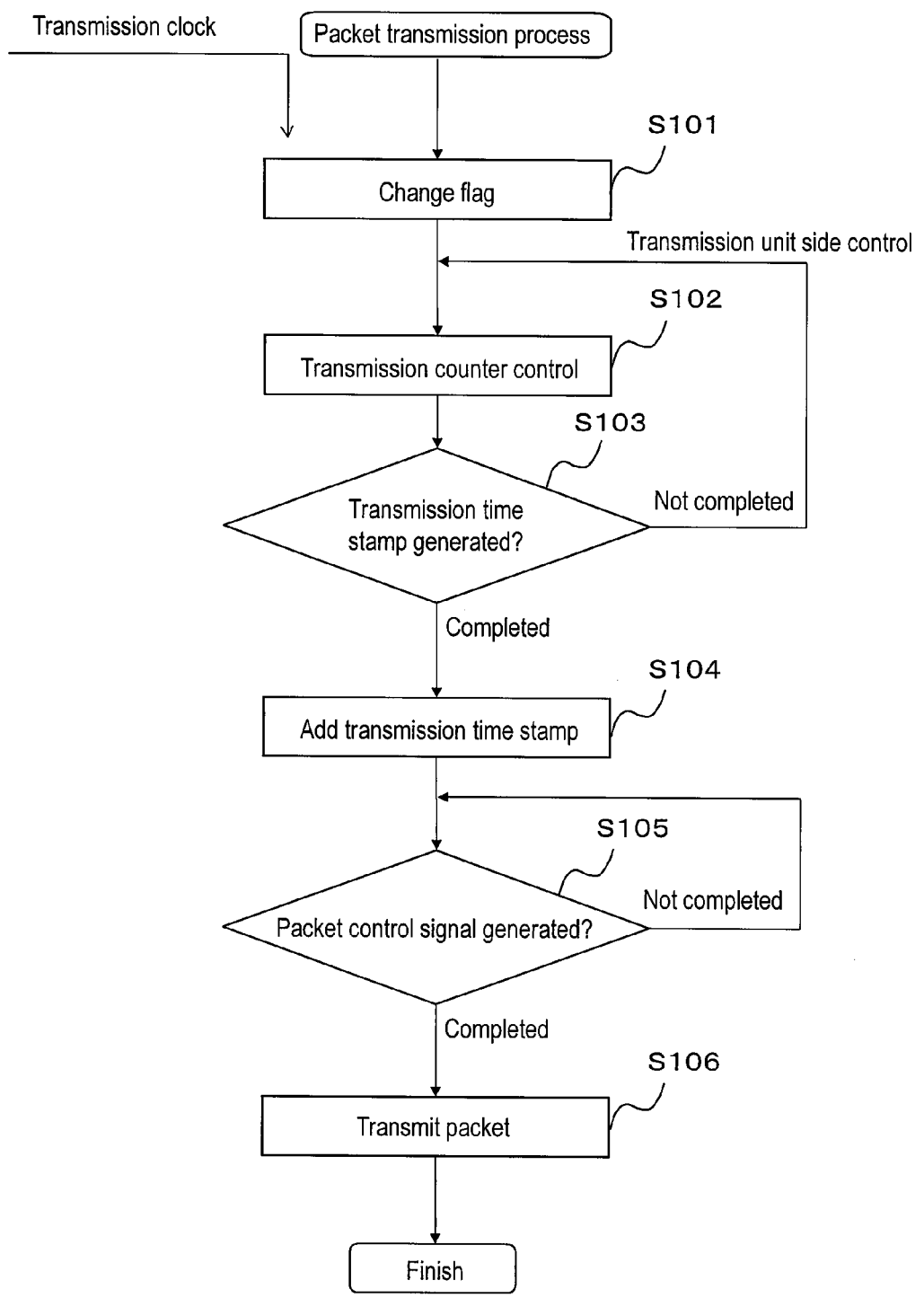
FIG. 4 is a view illustrating the process flow of a packet transmission process.

FIG. 4 illustrates the operational flow of the packet transmission process in the present embodiment. The packet transmission process is started when a transmitted MPEG-2 TS packet is received after the transmission device 10 is started up.

The flag processing unit 110 changes the flag (step S101). Specifically, the flag processing unit 110 changes the first byte of the MPEG-2 TS packet lead position as a flag from 47h (fixed value in the packet front) to 37h at a predetermined interval (for example, every 32 bytes) in the forward reproduction direction of one or a plurality of MPEG-2 TS packets, and transmits it to the transmission time stamp generation unit as an MPEG-2 TS packet 151.

Then, the time stamp application unit 120 carries out transmission counter control (step S102). Specifically, the time stamp application unit 120 identifies the transmission timing of each MPEG-2 TS packet in accordance with the value of the counter generated by the transmission time stamp counter unit 130.

Then, the time stamp application unit 120 determines whether or not generation of the transmission time stamp is completed (step S103). Specifically, the time stamp application unit 120 determines whether or not the time stamp generated by the transmission time stamp counter unit 130 has been generated, and if it has not been generated control is returned to step S102.

If the transmission time stamp has been generated ("Completed" at step S103), the time stamp application unit 120 applies the transmission time stamp (step S104). Specifically, the time stamp application unit 120 applies the time stamp 155 to the MPEG-2 TS packet 151 that is to be transmitted.

Then, the time stamp application unit 120 waits until a packet control signal has been generated (step S105), and when the packet control signal has been generated, the packet is transmitted (step S106).

This completes the process flow of the packet transmission process. As a result of the packet transmission process, the flag is applied to the MPEG-2 TS packets to be transmitted at the predetermined interval (for example, every 32 packets) in the forward reproduction direction, the time stamp is added, and the packets can be transmitted.

Figure 5:
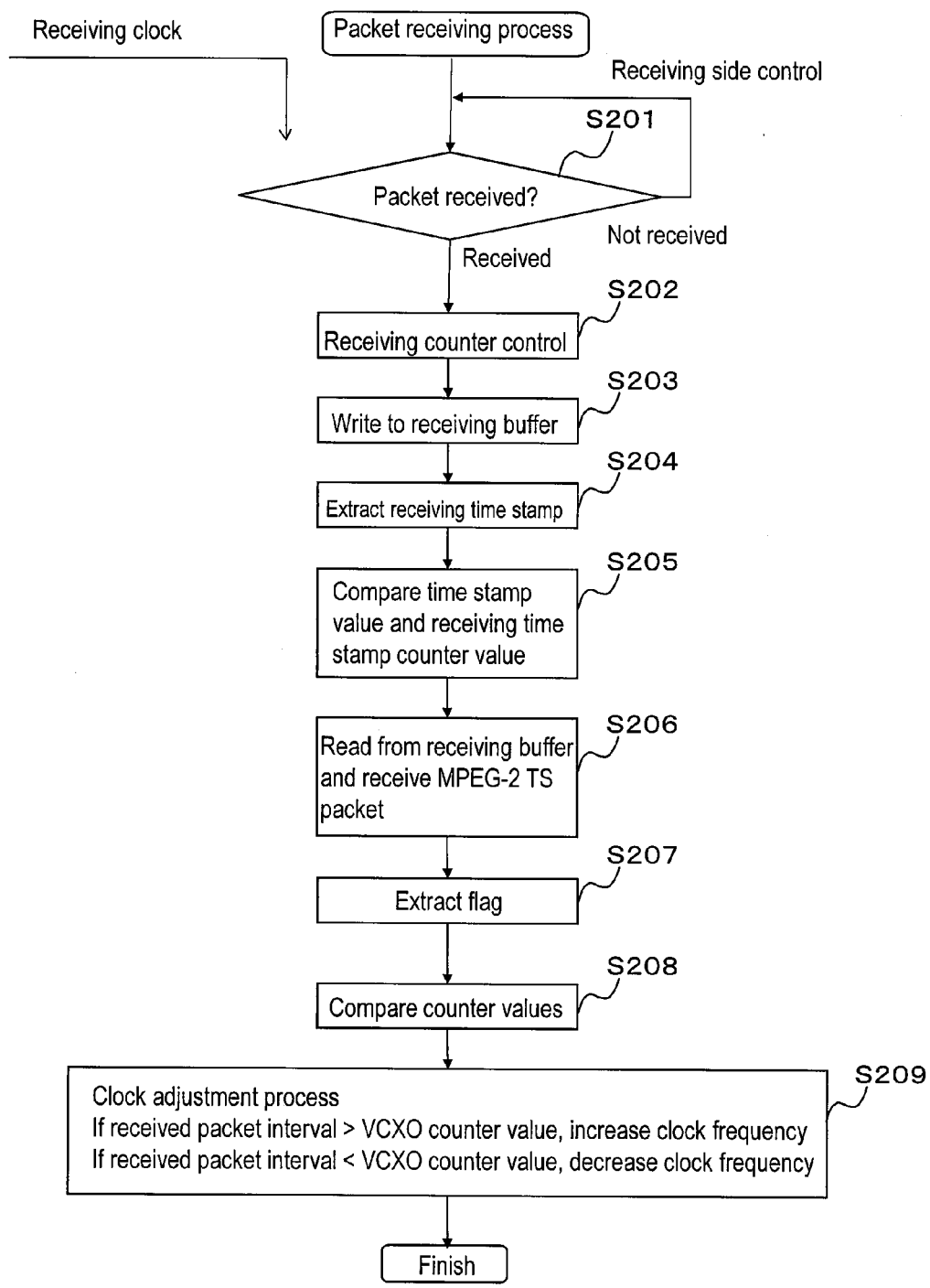
FIG. 5 is a view illustrating the process flow of a packet receiving process.

FIG. 5 illustrates the operational flow of the packet receiving process in the present embodiment. The packet receiving process is started when the receiving device 20 is started up.

First, the receiving buffer control unit 230 determines whether or not a packet has been received (step S201). Specifically, the receiving buffer control unit 230 determines whether or not an MPEG-2 TTS packet has been received via the transmission path. If a packet has not been received, the receiving buffer control unit 230 returns control to step S201.

If a packet has been received ("Received" at step S201), the receiving buffer control unit 230 carries out the packet receiving counter control (step S202). Specifically, the receiving buffer control unit 230 arranges the received MPEG-2 TTS packets in the order of the value of the time stamp 155.

Then, the receiving buffer control unit 230 writes to the receiving buffer (step S203). Specifically, the receiving buffer control unit 230 writes the MPEG-2 TTS packets in their arranged order to the double buffer 210.

Then, the time stamp value comparison unit 232 extracts the received time stamps (step S204). Specifically, the time stamp value comparison unit 232 obtains the values of the time stamps 155 from the MPEG-2 TTS packets stored in the double buffer 210.

Then, the time stamp value comparison unit 232 compares the time stamp value and the received counter value (step S205). Specifically, the time stamp value comparison unit 232 compares the value of the time stamp obtained in step S204 and the value of the received time stamp counter generated by the receiving time stamp counter unit 231.

Then, the receiving buffer control unit 230 reads the receiving buffer, and extracts the MPEG-2 TS packets (step S206). If the result of the comparison in step S205 is that the time stamp value is the same as the receiving time stamp counter value generated by the receiving time stamp counter unit 231, the receiving buffer control unit 230 reads the MPEG-2 TS packet 151 of the MPEG-2 TTS packet, and passes it to the flag extraction unit 220. At this time, in the case of packets for which the first byte at the beginning of the MPEG-2 TS packet is 37h, the receiving buffer control unit 230 sends the MPEG-2 TTS packets to a counter value comparison unit 242 as packets having flag information every predetermined number of packets (for example, every 32 packets).

Then the flag extraction unit 220 extracts the flag (step S207). Specifically, for MPEG-2 TS packets 151 received from the receiving buffer control unit 230 in which the first byte at the beginning is 37h, the flag extraction unit 220 rewrites it to 47h (fixed value in the packet front), and transmits the MPEG-2 TS packet 150 to the transmission path (for example, a transmission path connected to an OFDM modulator at the transmission destination).

The counter value comparison unit 242 compares the counter values (step S208). Specifically, the counter value comparison unit 242 compares the interval for applying the flag (the expected count value of the clock every 32 packets if no packets are lost) with the count value measured (counted) by the clock generated by the voltage controlled crystal oscillator (VCXO) in the transmission clock generation unit 241 between flags of the packets actually received, and identifies differences.

Then the counter value comparison unit 242 carries out the clock adjustment process for the transmission clock generation unit 241 (step S209). Specifically, if the count value between flags of the received packets is greater than the count value of the clock generated by the VCXO, the counter value comparison unit 242 increases the frequency of the transmission clock generation unit 241 in accordance with the magnitude of the difference, in other words instructs that the frequency be increased (increase the applied voltage). Alternatively, if the count value between flags of the received packets is less than the count value of the clock generated by the VCXO, the counter value comparison unit 242 reduces the frequency of the transmission clock generation unit 241 in accordance with the magnitude of the difference, in other words instructs that the frequency be decreased (reduce the applied voltage).

This completes the process flow of the packet receiving process. According to the packet receiving process, the receiving device 20 can adjust the frequency of the VCXO clock in accordance with the discrepancy generated between the expected receiving interval (clock) between flags in the packets and the VCXO clock, which is the output clock actually generated by the transmission clock generation unit 241.

Figure 6:
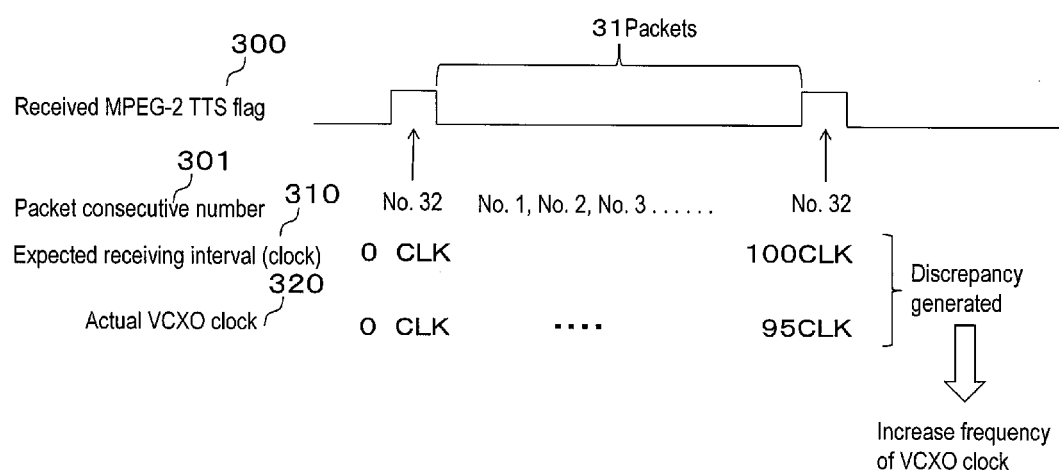
FIG. 6 is a view illustrating an example of increasing the clock frequency of the clock adjustment process.

FIG. 6 illustrates an example of clock adjustment in the packet receiving process. In this example it is necessary to increase the frequency of the VCXO clock. A flag 300 of the received MPEG-2 TTS packets is positive every 32 bytes. If a packet sequential number 301 is applied in the forward reproduction direction from a packet whose flag 300 is positive, then the 32nd packet will have a positive flag 300.

Here, if it is assumed that the clock generated by the packet corresponding to the 32nd packet sequential number 301 is the 100th clock from the packet whose flag 300 is positive, then if the actually generated VCXO clock 320 is the 95th clock, a discrepancy occurs in which the VCXO clock is slow. This discrepancy can be eliminated by increasing the frequency of the VCXO clock and adjusting the delay so that the generated clock is 100. Therefore, the counter value comparison unit 242 issues an instruction to the transmission clock generation unit 241 to increase the frequency.

Figure 7:
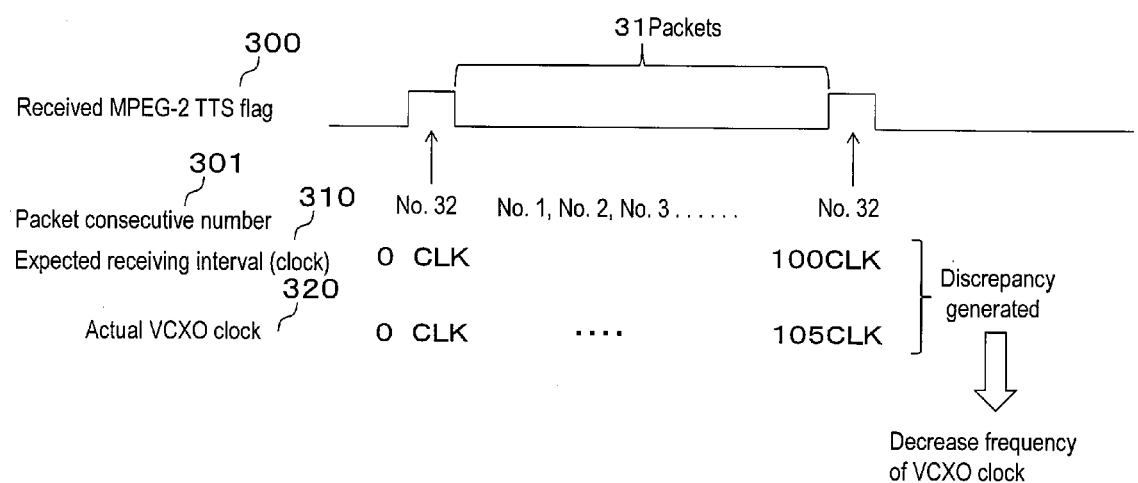
FIG. 7 is a view illustrating an example of reducing the clock frequency of the clock adjustment process.

FIG. 7 illustrates an example of clock adjustment in the packet receiving process. In this example it is necessary to decrease the frequency of the VCXO clock. A flag 300 of the received MPEG-2 TTS packets is positive every 32 bytes. If a packet sequential number 301 is applied in the forward reproduction direction from a packet whose flag 300 is positive, then the 32nd packet will have a positive flag 300.

Here, if it is assumed that the clock generated by the packet corresponding to the 32nd packet sequential number 301 is the 100th clock from the packet whose flag 300 is positive, then if the actually generated VCXO clock 320 is the 105th clock, a discrepancy occurs in which the VCXO clock is advanced. This discrepancy can be eliminated by reducing the frequency of the VCXO clock and adjusting the advancement so that the generated clock is 100. Therefore, the counter value comparison unit 242 issues an instruction to the transmission clock generation unit 241 to reduce the frequency.

This completes the description of the communication device that includes the transmission device 10 and the receiving device 20 that apply the first embodiment of the present invention. According to the first embodiment, in the transmission device 10 as communication device, the flag is added, and in the receiving device 20, the output clock can be adjusted in accordance with the flag interval, so it is possible to provide communication technology in which it is easy to maintain clock synchronization, even for a network where packet loss can easily occur. In other words, even when a packet is lost during transmission, it is possible to adjust the shift in the clock, so it is possible to smoothly reproduce video.

The present invention is not limited to the first embodiment as described above. Various modifications can be made to the first embodiment within the technical scope of the present invention. For example, in the first embodiment as described above, it was envisaged that the transmission device 10 and the receiving device 20 are different devices, but this is not a limitation, and they can be realized in the same device.

Figure 8:
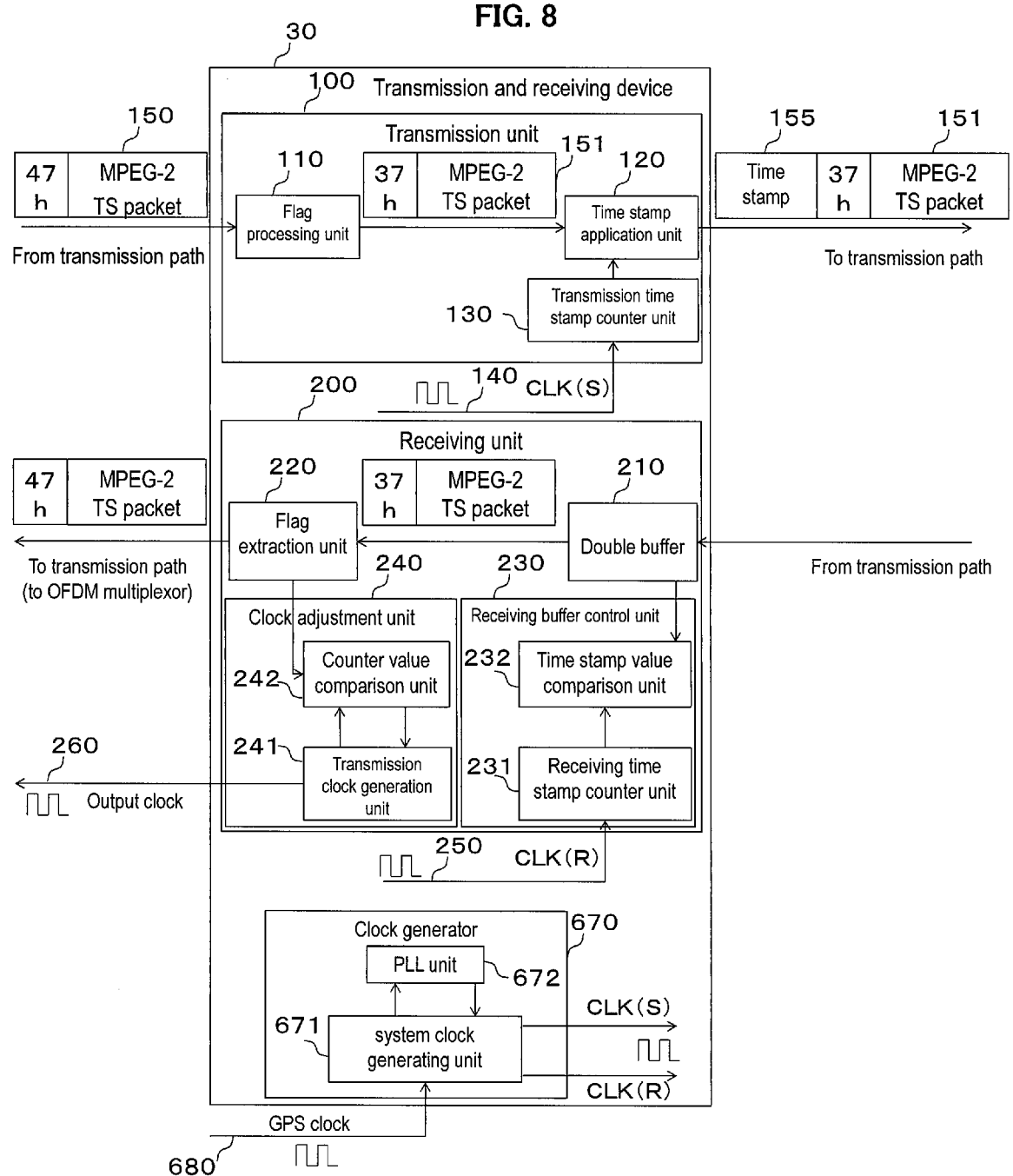
FIG. 8 is a block diagram of a transmission and receiving device according to a second embodiment of the present invention.

FIG. 8 illustrates an example of a transmission and receiving device 30 according to a second embodiment of this type. The transmission and receiving device 30 includes a transmission unit that is the same as the transmission unit 100 included in the transmission device 10, and a receiving unit that is the same as the receiving unit 200 included in the receiving device 20. Also, the transmission and receiving device 30 includes a clock generator 670 that includes a PLL unit 672 and a system clock generating unit 671 that output the CLK(S) and CLK(R) clocks to the transmission unit 100 and the receiving unit 200 respectively, using a GPS clock 680 received from outside.

With a transmission and receiving device 30 of this type, it is possible for transmission and receiving devices 30 to send to and receive from each other, so it is possible to establish a communication facility that easily distributes video highly accurately, such as a wired broadcast station or the like.

Figure 9:
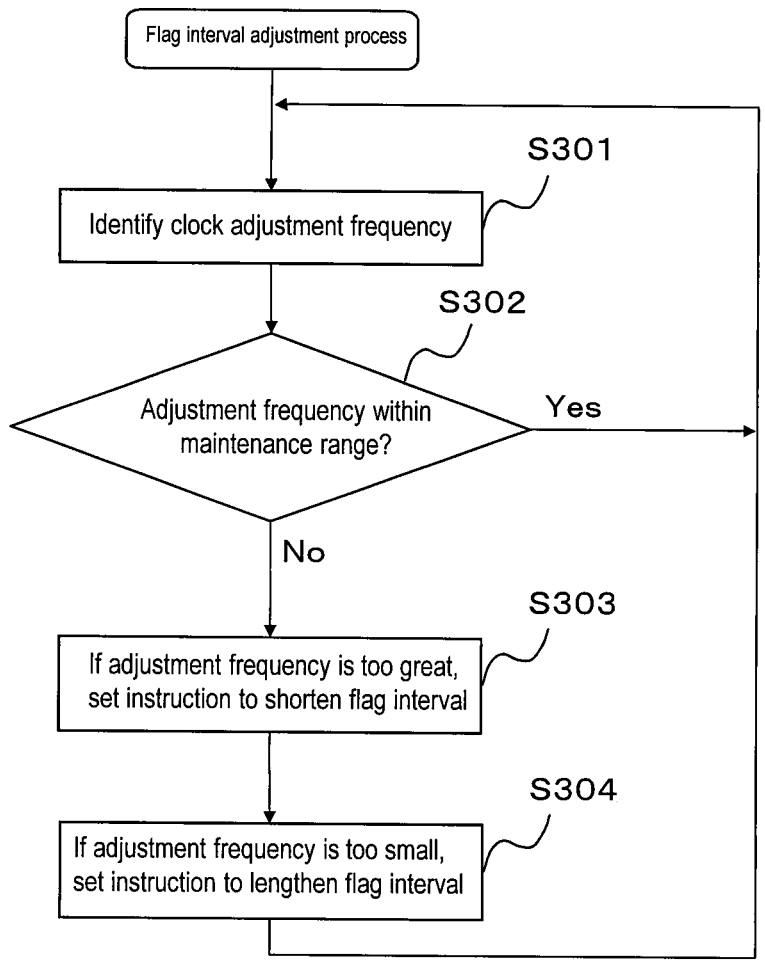
FIG. 9 is a view illustrating the process flow of a flag interval adjustment process according to the present invention.

Also, FIG. 9 illustrates the process flow for a flag interval adjustment process in which the clock adjustment unit 240 of the receiving unit 200 provides feedback instructions to the flag processing unit 110 to optimize the packet interval for setting the flag. The clock adjustment unit 240 sends instructions to the flag processing unit 110 via the transmission path in the first embodiment or via an internal bus or the like in the second embodiment.

First, the clock adjustment unit 240 identifies the frequency of adjustment of the clock (step S301). Specifically, the clock adjustment unit 240 calculates the number of times in a predetermined period of time that the clock adjustment process is carried out in step S209 of the packet receiving process, to determine the frequency of implementation per unit time.

Then, the clock adjustment unit 240 determines whether or not the determined frequency of adjustment is within a maintenance range (step S302). Specifically, the clock adjustment unit 240 determines whether or not the frequency of implementation determined in step S301 is contained between an upper limit value and a lower limit value. If it is within the maintenance range, the clock adjustment unit 240 returns control to step S301.

If it is not within the maintenance range ("No" in step S302), if the frequency of adjustment is too large the clock adjustment unit 240 instructs the flag processing unit 110 to set the flag interval shorter (step S303). Specifically, when the frequency of implementation is greater than a predetermined upper limit value, an instruction is given to shorten the interval for applying flags by a specific number of packets (for example, shorten the flag interval by two packets), in order to carry out the adjustment at a shorter interval, as a discrepancy can easily occur in the clock generated by the VCXO.

If the frequency of adjustment is too low, the clock adjustment unit 240 instructs the flag processing unit 110 to set the flag interval longer (step S304). Specifically, when the frequency of implementation is less than a predetermined lower limit value, an instruction is given to lengthen the interval for applying flags by a specific number of packets (for example, lengthen the flag interval by two packets), so that the clock generated by the VCXO is in a state close to the proper state and the accuracy can be maintained even by adjusting at a longer interval. Then the clock adjustment unit 240 returns control to step S301.

This completes the process flow of the flag interval adjustment process. By carrying out the flag interval adjustment process, it is possible to adjust the interval at which the flag is applied to the MPEG-2 TS packets, so when the operation is stable it is possible to increase the flag interval and eliminate wasteful synchronization processes, and when the operation is unstable it is possible to shorten the flag interval to enable a fine synchronization process.

Also, for example, the first embodiment of the present invention may include a packet interpolation function that interpolates packets when a packet is lost when MPEG-2 TS packets 150 are transmitted onto a transmission path from the receiving unit 200. The following is a description of a receiving device 20', the communication device of this type of as a third embodiment, with reference to the drawings. The configuration of the third embodiment is basically the same as that of the first embodiment, so the configuration that is the same as the configuration of the first embodiment is given the same reference numerals, and the description is omitted. Also, in the configuration of the first embodiment, the clock generator 270 generates a system clock based on the GPS clock 280, which is used in the receiving unit 200. However, the third embodiment is not limited to this, and the clock may be generated based on an oscillator such as a crystal oscillator or the like.

Figure 10:
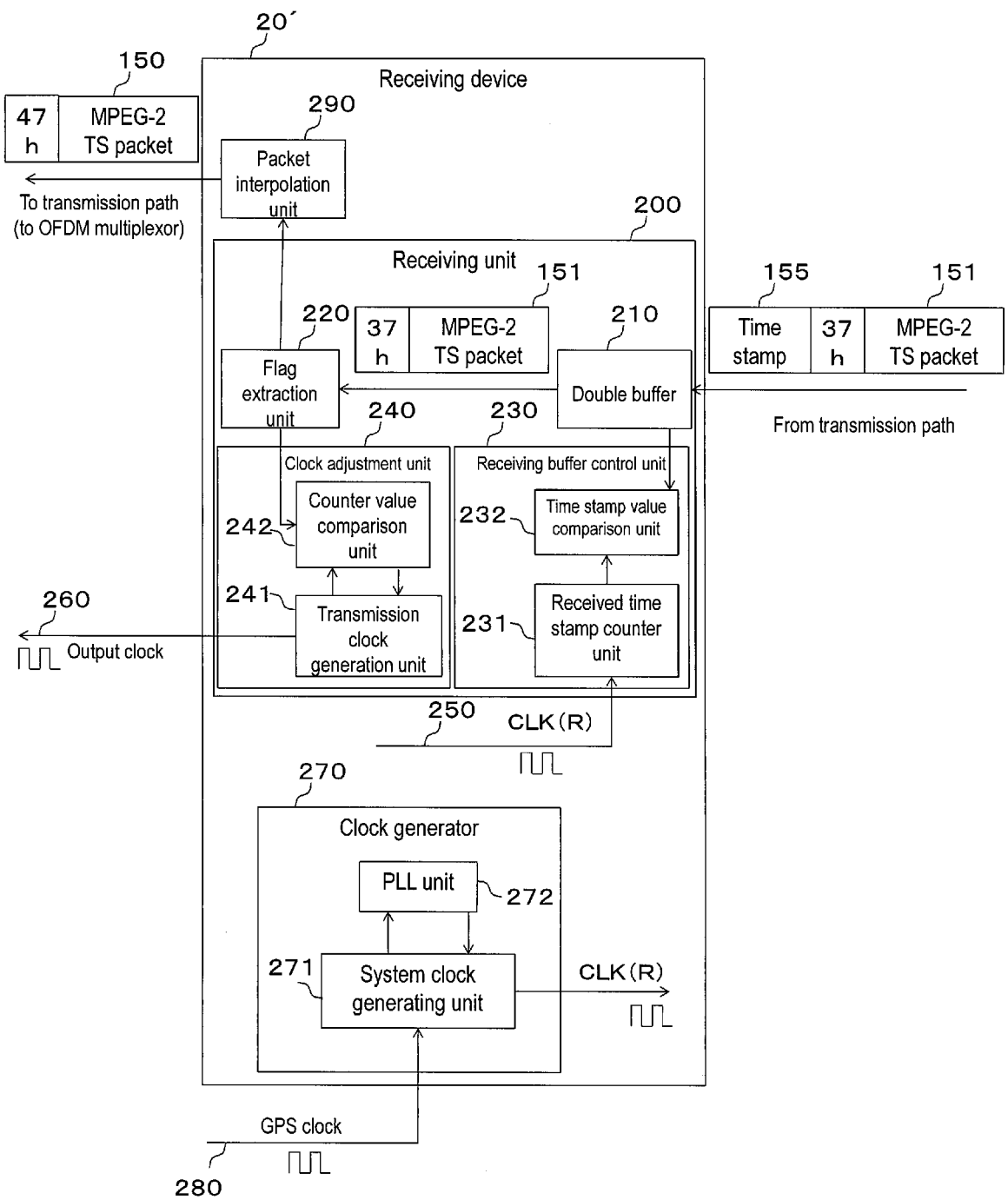
FIG. 10 is a block diagram of a receiving device according to the third embodiment of the present invention.

FIG. 10 is a block diagram of the receiving device 20' in the third embodiment of the present invention. The receiving device 20' envisaged in the present embodiment includes the receiving unit 200, the clock generator 270 that generates the clock (CLK(R)) that controls the operation of the receiving unit 200, and a packet interpolation unit 290 that monitors MPEG-2 TS packets 150 that are transmitted onto a transmission path (for example, a transmission path connected to the OFDM modulator at the transmission destination) from the receiving unit 200, and transmits an interpolated packet when a packet is lost.

The flag extraction unit 220 in the third embodiment transmits MPEG-2 TS packets 150 on a transmission path (for example, a transmission path connected to the OFDM modulator), but the transmitted MPEG-2 TS packets 150 pass through the packet interpolation unit 290 before arriving at the transmission path (transmission path connected to the OFDM modulator).

Figure 11:
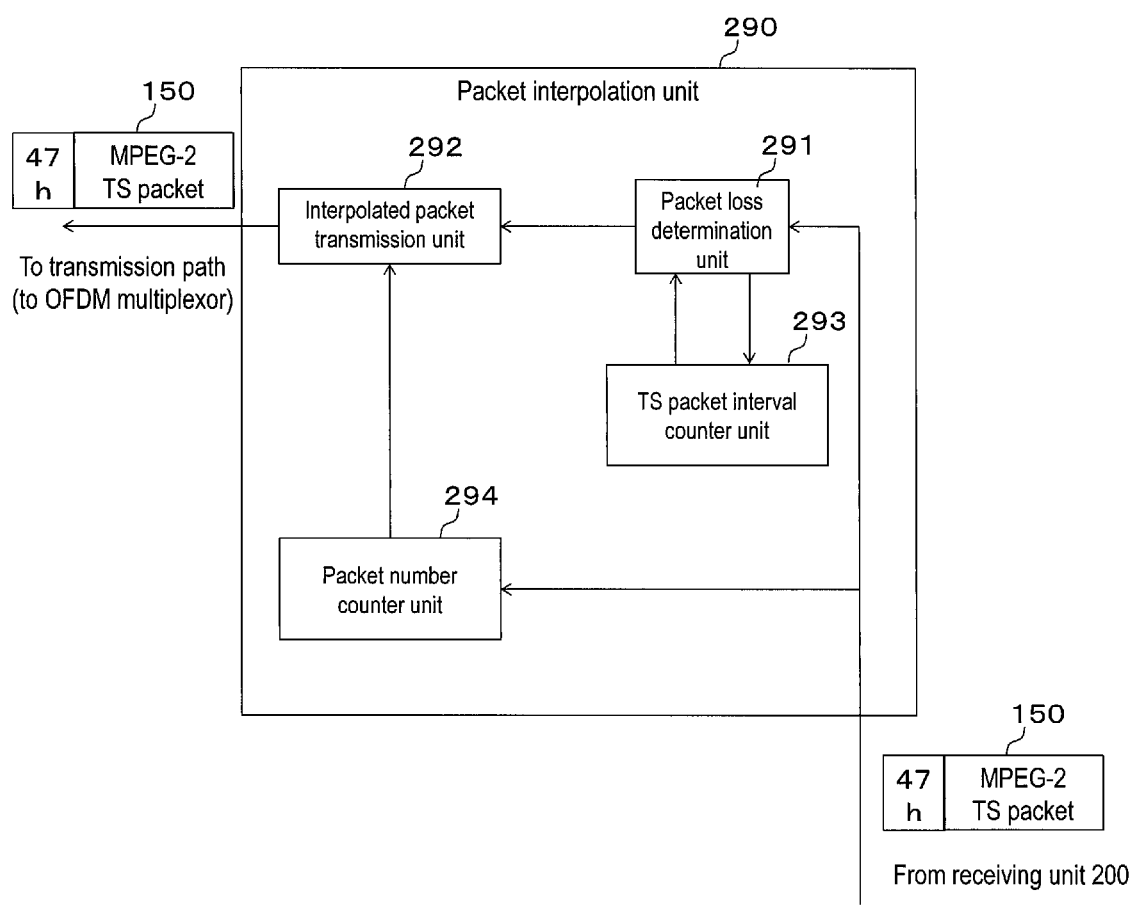
FIG. 11 is a block diagram of the packet interpolation unit of the present invention.

FIG. 11 is a block diagram of the packet interpolation unit 290. The packet interpolation unit 290 includes a packet loss determination unit 291, an interpolated packet transmission unit 292, a TS packet interval counter unit 293, and a packet number counter unit 294.

The packet loss determination unit 291 monitors MPEG-2 TS packets 150 transmitted by the receiving unit 200 to the transmission path (transmission path connected to the OFDM modulator), and if the packet interval is equal to or greater than a predetermined value (for example, in the case of a digital terrestrial broadcast signal, 1357 clocks or more), it determines that packet loss has occurred, and gives an instruction to the interpolated packet transmission unit 292 to transmit an interpolated packet instead of the lost packet.

The TS packet interval counter unit 293 counts the interval (clock) between the fronts of each of the MPEG-2 TS packets 150 transmitted from the receiving unit 200 to the transmission path (transmission path connected to the OFDM modulator). The TS packet interval counter unit 293 notifies the packet loss determination unit 291 of the value of the count.

When the interpolated packet transmission unit 292 receives the instruction to transmit an interpolated packet from the packet loss determination unit 291, it identifies the interpolated packet from predetermined interpolated packets and transmits it to the transmission path (transmission path connected to the OFDM modulator). When identifying the interpolated packet, the interpolated packet transmission unit 292 identifies an interpolated packet having a packet number that is the incremented packet number recorded by the packet number counter unit 294 as the interpolated packet to be transmitted.

The packet number counter unit 294 monitors the MPEG-2 TS packets 150 transmitted from the receiving unit 200 to the transmission path (transmission path connected to the OFDM modulator), and records the packet numbers included in the transmitted packets. Normally the packet number is a number allocated in accordance with a predetermined criterion, so when a packet is lost, a skipped number not complying with the packet numbering criterion occurs between the packets before and after the lost packet. In the case of a digital terrestrial broadcast signal, the packet number counter unit 294 acquires frame synchronization identification information and TSP counter value information included in the information referred to as the 16 byte length dummy bytes included in the broadcast TS packets.

Figure 12:
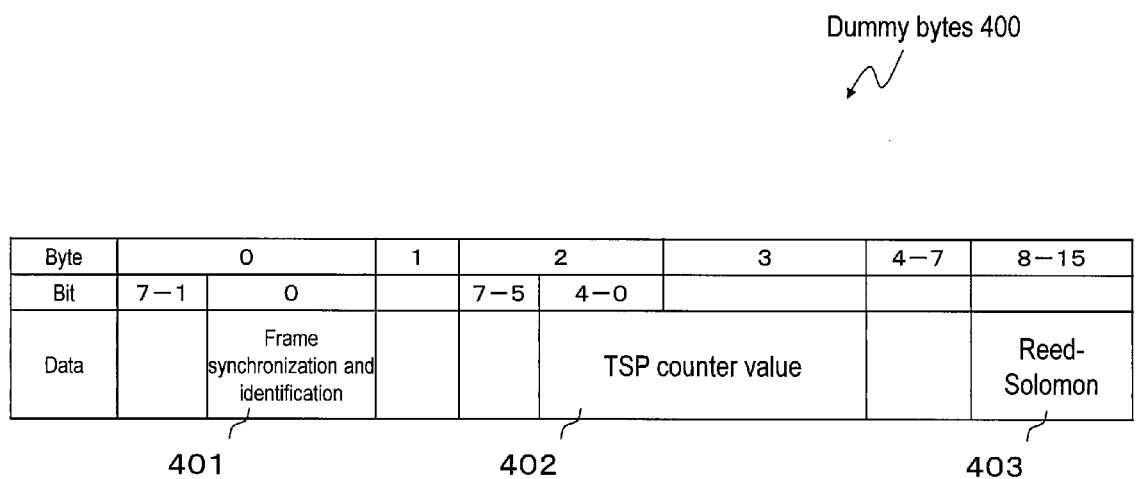
FIG. 12 is a view illustrating the data structure of dummy bytes.

FIG. 12 is a view illustrating the data structure of dummy bytes 400. In the broadcast TS, information referred to as dummy bytes 16 bytes long is added to the rear end of the 188 bytes of a MPEG packet to provide a 204 byte data structure. The eighth bit counted from the front of the front byte (byte 0) of the dummy bytes 400 stores a frame synchronization identification bit 401 that identifies whether the frame is odd or even, and the frame synchronization identification information referred to above corresponds to this bit. Also, a TSP counter value 402 (for example, can take a value that can revolve, returning to the initial value when the upper limit value of predetermined limits is exceeded), which is a specific value, is stored in between the fourth bit counted from the front of the third byte (byte 2) from the front of the dummy bytes 400 to the final bit (eighth bit) of the fourth byte (byte 3), and the TSP counter value information referred to above corresponds to the value indicated by this string of bits.

In addition, a Reed-Solomon code 403 is stored from the front bit of the ninth byte from the front of the dummy bytes (byte 8) to the rearmost bit of the rearmost byte (byte 15). The Reed-Solomon code 403 is a value based on the image data to be transmitted, in which the values between continuous TS packets are not necessarily similar, even though for example the image data can appear to be similar. The Reed-Solomon code is information used for correcting errors on the packet receiving side, so in order to properly correct errors in the TS packets, it is necessary to calculate the Reed-Solomon code in accordance with the content of the TS packet, in other words in accordance with the transmitted image information. However, the computation load associated with calculating the Reed-Solomon code is comparatively high, and there is a possibility that it will be impossible to use a calculation that requires the responsiveness to calculate in accordance with the image information to be interpolated in the period after, for example, a packet loss is detected and until transmission.

Therefore, the interpolated packet transmission unit 292 has recorded in the OFDM multiplexor in advance as interpolated packets dummy byte information having appropriate Reed-Solomon codes in accordance with the frame synchronization identification information, TSP counter values, and image information so that an operational fault will not occur, and is configured so that when an interpolation instruction is received, the interpolated packet transmission unit 292 allocates a dummy byte having the missing TSP counter value (for example, the TSP counter value in accordance with the number of lost packets, even in the case that continuous packets are lost). In other words, when identifying interpolated packets, the interpolated packet transmission unit 292 identifies and transmits by estimating an interpolated packet having a specific packet number obtained by incrementing the packet number recorded by the packet number counter unit 294 by the number of continuous missing packets.

The dummy byte information used as the interpolated packets is not limited to the above, and a NULL packet received by the receiving device 20' may be recorded as needed in correspondence with the packet number, and the recorded NULL packet may be allocated. Normally in terrestrial digital broadcasting, NULL packets are included to a certain extent, so, for example, the packet number counter unit 294 may record as needed the received NULL packets for each packet number (for each combination of frame synchronization identification information and TSP counter value), and when interpolation is needed the recorded NULL packets may be passed to the interpolated packet transmission unit 292 as interpolated packets.

When image information that includes interpolated packets is reproduced, strictly speaking the image that should be represented is disturbed by the interpolated packet, but frequently it is partial information that is compensated for with the interpolated packet, so provided that the number of lost packets is kept to less than a certain level, it is possible to avoid to a certain extent that possibility of a fault such that the whole image cannot be seen. In contrast, if for example the packets reach the OFDM multiplexor with the lost packets and without interpolated packets, the synchronization signal is also lost, so there is a possibility that there will be complete black out of the image for re-synchronization. Also, if a packet is received by the OFDM multiplexor whose Reed-Solomon code is not appropriate, the packet is destroyed, and there is a possibility of black out of the whole image, the same as for a lost packet.

The above was an example of packet interpolation unit 290. According to the packet interpolation unit 290, when the receiving device 20 loses a packet, it is possible to send an interpolated packet that has little effect on the stable operation of the OFDM multiplexor.

This completes the description of the receiving device 20', a communication device that applies the third embodiment of the present invention.

The packet interpolation unit 290 according to the third embodiment is not limited to the receiving device 20' as described above, provided it is connected between the receiving unit 200 of the transmission and receiving device 30 and the transmission path.

In the embodiments as described above, in the flag process carried out by the flag processing unit 110 the expression positive was used with the meaning of raising a flag, and negative was used with the meaning of lowering a flag, but this is not a limitation. For example, information in a predetermined offset position on the packet may be changed to the flag information, and information in a predetermined offset position on the packet may be deleted. Also, information in a predetermined offset position may be processed by rearranging or the like, in accordance with a predetermined rule.

Also, the technical elements of the embodiments as described above may be applied independently, or they may be applied separately as a plurality of parts such as a program component or a hardware component.

This completes the description of the present invention based on the embodiments.

REFERENCE NUMERALS

10 Transmission device
20 Receiving device
30 Transmission and receiving device
100 Transmission unit
110 Flag processing unit
120 Time stamp application unit
130 Transmission time stamp counter unit
140 CLK(S)
150 MPEG-2 TS packet
151 MPEG-2 TS packet
155 Time stamp 160 Clock generator
161 System clock generating unit
162 PLL unit
180 GPS clock
200 Receiving unit
210 Double buffer
220 Flag extraction unit
230 Receiving buffer control unit
231 Receiving time stamp counter unit
232 Time stamp value comparison unit
240 Clock adjustment unit
241 Transmission clock generation unit
242 Counter value comparison unit
250 CLK(R)
260 Output clock
270 Clock generator
271 System clock generating unit
272 PLL unit
280 GPS clock
290 Packet interpolation unit
291 Packet loss determination unit
292 Interpolated packet transmission unit
293 TS packet interval counter unit
294 Packet number counter unit
400 Dummy bytes
401 Frame synchronization identification bit
402 TSP counter value
403 Reed-Solomon code
670 Clock generator
671 System clock generating unit
672 PLL unit
680 GPS clock

What is claimed is:

1. A communication device, comprising:
a packet loss determination unit that determines whether a packet that transmits image information has been lost; and
an interpolated packet transmission unit that transmits an interpolated packet when a packet that transmits image information has been lost, wherein
the interpolated packet transmission unit
estimates specific information of the lost packet that transmits the image information based on specific information of the packet that transmits image information immediately before the lost packet, and
transmits a packet having the estimated specific information and an appropriate Reed-Solomon code as the interpolated packet.

2. The communication device according to claim 1, wherein
the packet loss determination unit determines that a packet has been lost when the interval between packets that transmit image information is equal to or greater than a predetermined interval.

3. The communication device according to claim 1, wherein
the interpolated packet transmission unit
has in advance the specific information of the packets to be transmitted as interpolated packets.

4. The communication device according to claim 1, further comprising
a packet number counter unit that records received NULL packets in correspondence to the specific information, and
the interpolated packet transmission unit
uses the NULL packet as the packet to be transmitted as the interpolated packet.

5. A non-transitory computer readable medium storing a communication program that causes a computer to function as a communication device,
the computer being operated as control means,
the communication program causes the control means to execute:
a packet loss determining step of determining whether a packet that transmits image information has been lost; and
an interpolated packet transmitting step of transmitting an interpolated packet when a packet that transmits image information has been lost, wherein
in the interpolated packet transmitting step, the computer
estimates specific information of the lost packet that transmits the image information based on specific information of the packet that transmits image information immediately before the lost packet, and
transmits a packet having the estimated specific information and an appropriate Reed-Solomon code as the interpolated packet.

6. A communication method using a computer, wherein the computer executes
a packet loss determining step of determining whether a packet that transmits image information has been lost; and
an interpolated packet transmitting step of transmitting an interpolated packet when a packet that transmits image information has been lost, wherein
in the interpolated packet transmitting step, the computer
estimates specific information of the lost packet that transmits the image information based on specific information of the packet that transmits image information immediately before the lost packet, and
transmits a packet having the estimated specific information and an appropriate Reed-Solomon code as the interpolated packet.

7. An information processing device, comprising:
an interpolated packet transmission unit that
transmits an interpolated packet when it is found that a packet that transmits image information has been lost;
estimates specific information of the lost packet that transmits the image information based on specific information of the packet that transmits image information immediately before the lost packet; and
transmits a packet having the estimated specific information and an appropriate Reed-Solomon code as the interpolated packet.

* * * * *